United States Patent
Young et al.

(10) Patent No.: US 10,534,936 B2
(45) Date of Patent: Jan. 14, 2020

(54) SYSTEM AND METHOD FOR ENABLING AND DISABLING OF BASEBOARD MANAGEMENT CONTROLLER CONFIGURATION LOCKDOWN

(71) Applicant: DELL PROUDUCTS, LP, Round Rock, TX (US)

(72) Inventors: Jason M. Young, Round Rock, TX (US); Marshal F. Savage, Austin, TX (US)

(73) Assignee: Dell Products, LP, Round Rock, TX (US)

(*) Notice: Subject to any disclaimer, the term of this patent is extended or adjusted under 35 U.S.C. 154(b) by 197 days.

(21) Appl. No.: 15/691,128

(22) Filed: Aug. 30, 2017

(65) Prior Publication Data
US 2019/0065786 A1 Feb. 28, 2019

(51) Int. Cl.
  *G06F 21/74* (2013.01)
  *G06F 21/57* (2013.01)
  *H04L 9/32* (2006.01)
  *H04L 9/08* (2006.01)

(52) U.S. Cl.
CPC .............. *G06F 21/74* (2013.01); *G06F 21/57* (2013.01); *H04L 9/0891* (2013.01); *H04L 9/3247* (2013.01); *G06F 2221/033* (2013.01); *G06F 2221/2105* (2013.01)

(58) Field of Classification Search
CPC ... G06F 21/74; G06F 2221/033; H04L 9/3247
See application file for complete search history.

(56) References Cited

U.S. PATENT DOCUMENTS

| | | | |
|---|---|---|---|
| 7,474,888 B1 | 1/2009 | Davis et al. | |
| 10,084,604 B2* | 9/2018 | Burghardt | G06F 21/34 |
| 10,142,104 B2* | 11/2018 | De Atley | G06F 21/51 |
| 2003/0028781 A1* | 2/2003 | Strongin | G06F 9/24 |
| | | | 713/182 |
| 2005/0210231 A1* | 9/2005 | Bouchier | G06F 9/5077 |
| | | | 713/1 |
| 2006/0107117 A1* | 5/2006 | Michaelis | G06F 11/1658 |
| | | | 714/25 |
| 2008/0060068 A1 | 3/2008 | Mabayoje et al. | |
| 2008/0250403 A1* | 10/2008 | Moon | G06F 8/30 |
| | | | 717/169 |
| 2013/0007430 A1 | 1/2013 | Fan | |
| 2015/0169330 A1 | 6/2015 | Maitey et al. | |
| 2016/0055068 A1* | 2/2016 | Jeansonne | G06F 21/572 |
| | | | 714/15 |

* cited by examiner

*Primary Examiner* — Phil K Nguyen
(74) *Attorney, Agent, or Firm* — Larson Newman, LLP (57) ABSTRACT

An information handling system includes a processor and a baseboard management controller (BMC). The BMC receives a secure copy protocol (SCP) file including configuration information for the processor, determines whether the BMC is in a lockdown mode in response to receiving the SCP file, and applies the configuration information to change a configuration of the processor in response to determining that the information handling system is not in the lockdown mode.

20 Claims, 5 Drawing Sheets

SYSTEM AND METHOD FOR ENABLING AND DISABLING OF BASEBOARD MANAGEMENT CONTROLLER CONFIGURATION LOCKDOWN

FIELD OF THE DISCLOSURE

This disclosure generally relates to information handling systems, and more particularly relates to enabling and disabling of a baseboard management controller configuration lockdown mode.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processor and a baseboard management controller (BMC). The BMC may receive a secure copy protocol (SCP) file including configuration information for the processor, determine whether the BMC is in a lockdown mode in response to receiving the SCP file, and apply the configuration information to change a configuration of the processor in response to determining that the information handling system is not in the lockdown mode.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
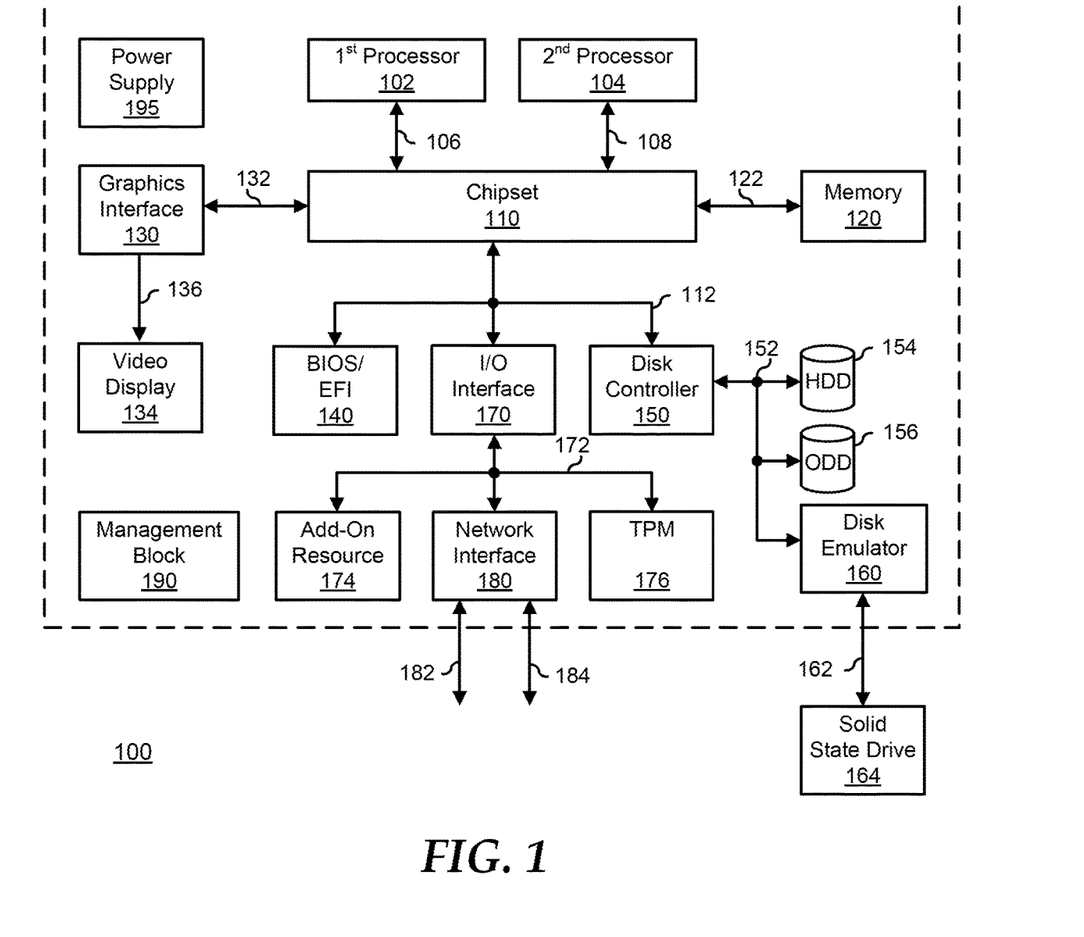
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the OPF system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/extensible firmware interface (BIOS/EFI) module 140, a disk controller 150, a hard disk drive (HDD) 154, an optical disk drive (ODD) 156, a disk emulator 160 connected to an external solid state drive (SSD) 162, an input/ output (I/O) interface 170, one or more add-on resources 174, a trusted platform module (TPM) 176, a network interface 180, a management block 190, and a power supply 195. Processors 102 and 104, chipset 110, memory 120, graphics interface 130, BIOS/EFI module 140, disk controller 150, HDD 154, ODD 156, disk emulator 160, SSD 162, I/O interface 170, add-on resources 174, TPM 176, and network interface 180 operate together to provide a host environment of information handling system 100 that operates to provide the data processing functionality of the information handling system. The host environment operates to execute machine-executable code, including platform BIOS/EFI code, device firmware, operating system code, applications, programs, and the like, to perform the data processing tasks associated with information handling system 100.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management block 190 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. In particular, management block 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management block 190 can include a network connection to an external management system, and the management block can communicate with the management system to report status information for information handling system 100, to receive BIOS/UEFI or system firmware updates, or to perform other task for managing and controlling the operation of information handling system 100. Management block 190 can operate off of a separate power plane from the components of the host environment so that the management block receives power to manage information handling system 100 when the information handling system is otherwise shut down. An example of management block 190 may include a commercially available BMC product that operates in accordance with an Intelligent Platform Management Initiative (IPMI) specification, such as a Integrated Dell Remote Access Controller (iDRAC), or the like. Management block 190 may further include associated memory devices, logic devices, security devices, or the like, as needed or desired.

Power supply 195 represents one or more devices for power distribution to the components of information handling system 100. In particular, power supply 195 can include a main power supply that receives power from an input power source, such as a wall power outlet, a power strip, a battery, or another power source, as needed or desired. Here, power source 195 operates to convert the power at a first voltage level from the input power source to one or more power rails that are utilized by the components of information handling system. Power supply 195 can also include one or more voltage regulators (VRs) that each receive power from the main power supply and that operate to convert the input voltage to an output voltage that is used by one or more components of information handling system. For example, a VR can be provided for each of processors 102 and 104, and another VR can be provided for memory 120. Power supply 195 can be configured to provide a first power plane that provides power to the host environment, and to provide a second power plane that provides power to the management environment.

Figure 2:
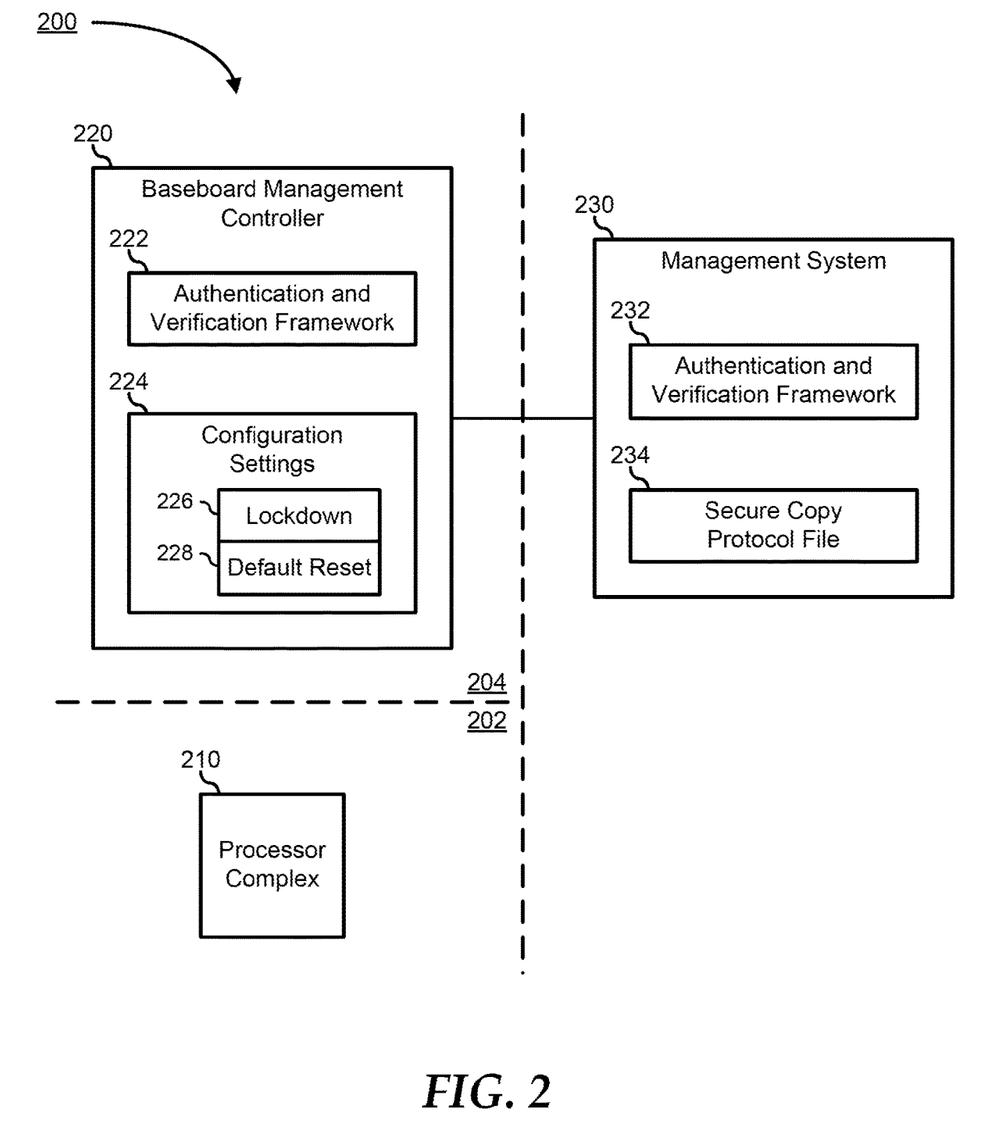
FIG. 2 is a block diagram illustrating an information handling system according to an embodiment of the present disclosure.

FIG. 2 illustrates an information handling system 200 including a host environment 202 and a management environment 204. Host environment 202 includes a processor complex 210. Host environment 202 operates to provide data processing functionality of information handling system 200, such as is typically associated with an information handling system. As such, processor complex 210 represents a data processing apparatus, such as one or more central processing units (CPUs) or processor cores, and the associated data input and output I/O functionality, such as a chipset component, and another I/O processor components. Processor complex 210 operates to execute machine-executable code to perform the data processing tasks associated with information handling system 200. FIG. 2 also illustrates a management system 230 that is separate from information handling system 200, but that is able to be connected to the information handling system, as described further, below.

Management environment 204 includes a BMC 220. Management environment 204 operates to implement and manage various maintenance, operation, and system update processes for information handling system 200 that are not typically associated with the data processing functionality of information handling system 200. For example, management environment 204 may provide for out-of-band management of the various code executed on host environment 202, such as BIOS code or UEFI code, firmware code, programs, applications, operating systems, and the like. BMC 220 can utilize an Intelligent Platform Management Interface (IPMI) protocol and one or more additional communication protocols and interfaces to perform the functions and features as described herein. In particular, management block 204 can operate on a different power plane than host environment 202, such that the management block can download and store updated code for the host environment, even when the host environment is powered off. Management environment 204 also operates to monitor and maintain the functions and features of information handling system 200 that are not necessarily associated with the data processing operations performed by host environment 202, such as system thermal and cooling management, fan speed adjustment, power supply monitoring and adjustment, and the like. The mechanisms and method of system management via a BMC are known in the art and are beyond the scope of the present disclosure.

BMC 220 operates to implement and manage the various maintenance, operation, and system update processes for information handling system 200 via various interfaces, including a USB interface, an I2C interface, a LPC interface, a LAN interface, a graphics interface, or another interface as needed or desired. A LAN interface represents an interface to connect BMC 220 to a management network that includes one or more BMCs in other information handling systems similar to information handling system 200, and to management system 230. As such, the management network can represent an Ethernet or other network protocol connection to BMC 220, or can represent an internal connection to a Host Bus Adapter (HBA) that virtualizes network access to the BMC via a PCIe link utilizing a Network Controller Sideband Interface (NCSI), as needed or desired. In another example, the management network can represent a wireless communication interface to BMC 220, such as a Near Field Communication (NFC) interface, a Bluetooth interface, a WiFi (802.11) interface, or another wireless interface.

BMC 220 includes an authentication and verification framework 222, and management system 230 includes a compatible authentication and verification framework 232, whereby the secure channel is implemented. Authentication and verification frameworks 222 and 232 thus operate in accordance with a particular security protocol to establish the secure channel. An example of a security protocol includes a Hyper Text Transfer Protocol-Secure (HTTPS) protocol, a Secure Shell (SSH) protocol, a Secure Socket Layer (SSL) or Transport Layer Security (TLS) protocol, a File Transfer Protocol-Secure (FTPS) protocol such as FTP over the SSH protocol or FTP over the SSL protocol, a Common Internet File System (CIFS) protocol, or another security protocol, as needed or desired. Although the establishment of a secure channel is important to the present disclosure, the details of establishing a secure channel are known in the art and are beyond the scope of the present disclosure, and will not be further described except as needed to further illuminate the teachings of the present disclosure.

Management system 230 operates to direct BMC 220 to implement and manage the various maintenance, operation, and system update processes for information handling system 200 by sending configuration information to the BMC via the management network. In a particular embodiment, the configuration information is formatted into a file in accordance with a secure copy protocol (SCP) format that permits the configuration information to be digitally signed and securely communicated over the management network. Here, a management command, an operation, a procedure, a macro, or other information that is interpretable by BMC 220 to implement and manage the various maintenance, operation, and system update processes is formatted as an SCP file 234. Then management system 230 sets up a secure channel over the management network with BMC 220 to transfer SCP file 234 to the BMC. Finally, BMC 230 authenticates SCP file 234 as being derived from a known, secure source and implements the various maintenance, operation, and system update processes as directed by the SCP file. The implementation of the various maintenance, operation, and system update processes are hereinafter represented as BMC 220 making changes to configuration settings 224, and may operate on elements of host environment 202 or on elements of management environment 204, as needed or desired.

Configuration settings 224 include a lockdown enable setting 226. Lockdown enable setting 226 represents a setting that, when set, prevents BMC 220 from making changes to other of configuration settings 224 without an authenticating a received SCP file to determine the that the source of the SCP file is a trusted source. In particular, authentication and verification frameworks 222 and 232 provide a framework for symmetric and asymmetric key exchanges, creation and authentication of digital signatures, verification of chains of trust, and the like. For example, authentication and verification frameworks 222 and 232 can implement various digital signature schemes, such as the RSA digital signature algorithm and its variants, and utilized various certificate authorities (CAs) or hardware security modules (HSMs) to create one or more digital signatures that ensure the chain of trust for SCP file 234, and that are known and authorized on information handling system 200. The details of symmetric and asymmetric key exchanges, creation and authentication of digital signatures, verification of chains of trust, and the like, are known in the art, and will not be further described herein, except as needed to describe the present invention.

More particularly, when BMC 220 is in a lockdown mode, as provided by a particular state of lockdown enable setting 226, the BMC will disregard any configuration information included in SCP file 234 unless the SCP file includes a valid digital signature is present in the SCP file. As such, in creating SCP file 234, authentication and verification framework 232 operates to digitally sign the SCP file by creating a unique digital signature based on the contents of the SCP file, or by providing one or more digital signature that form a chain back to a commonly accepted root of trust. When BMC 220 successfully validates the digital signature, then the configuration information will be applied by the BMC to configuration settings 226.

In addition to providing configuration information to be applied to configuration settings 226, SCP file 234 can include a second digital signature that includes a new public key for authenticating future SCP files, in order to provide for key rotation. For example, a particular SCP file may be intended for one-time use, and so, by rotating the public key in BMC 220, any future attempts to execute the particular SCP file will fail because the original digital signature will not authenticate under the new public key in the BMC. Further, SCP file 234 can operate to disable the lockdown mode on BMC 220 by including configuration information to set lockdown enable setting to a disabled state. Here, when BMC 220 receives such configuration information, the BMC erases the public key, thereby clearing the authentication mechanism of authentication and verification framework 222, and disables the lockdown mode. In a particular embodiment, lockdown enable setting 226 represents multiple lockdown modes that are each associated with different subsets of the various maintenance, operation, and system update processes available to BMC 220. For example, lockdown modes can be arranged in accordance with various data center administrator functions, such as network administration, hardware and operations administration, virtualization administration, or other functions, as needed or desired. In another example, lockdown modes can be arranged in accordance with functional features of information handling system 200, such as features related to host environment 202, features related to management environment 204, features related to operations of the information handling system such as fan speeds, voltage regulator setting, temperature thresholds and the like, or other functional features of the information handlings system.

In a particular embodiment, it may become necessary to perform a full reset of information handling system 200 such that all configuration settings are restored to factory default settings. Here, configuration settings 224 includes a factory default reset setting 228 that operates to restore the configuration settings to factory default settings. Further, authentication and verification framework 222 includes a public key that is associated with factory default reset setting 228. Then, when a user of information handling system 200 desires to perform a full reset, the user can verify their authenticity to a factory root of trust, such as a CA or a HSM, and the factor root of trust will provide the user with a digital signature associated with the public key. The user then provides a SCP file with the digital signature to BMC 220, and the BMC will perform the full reset of information handling system 200 to its factory default settings.

Figure 3:
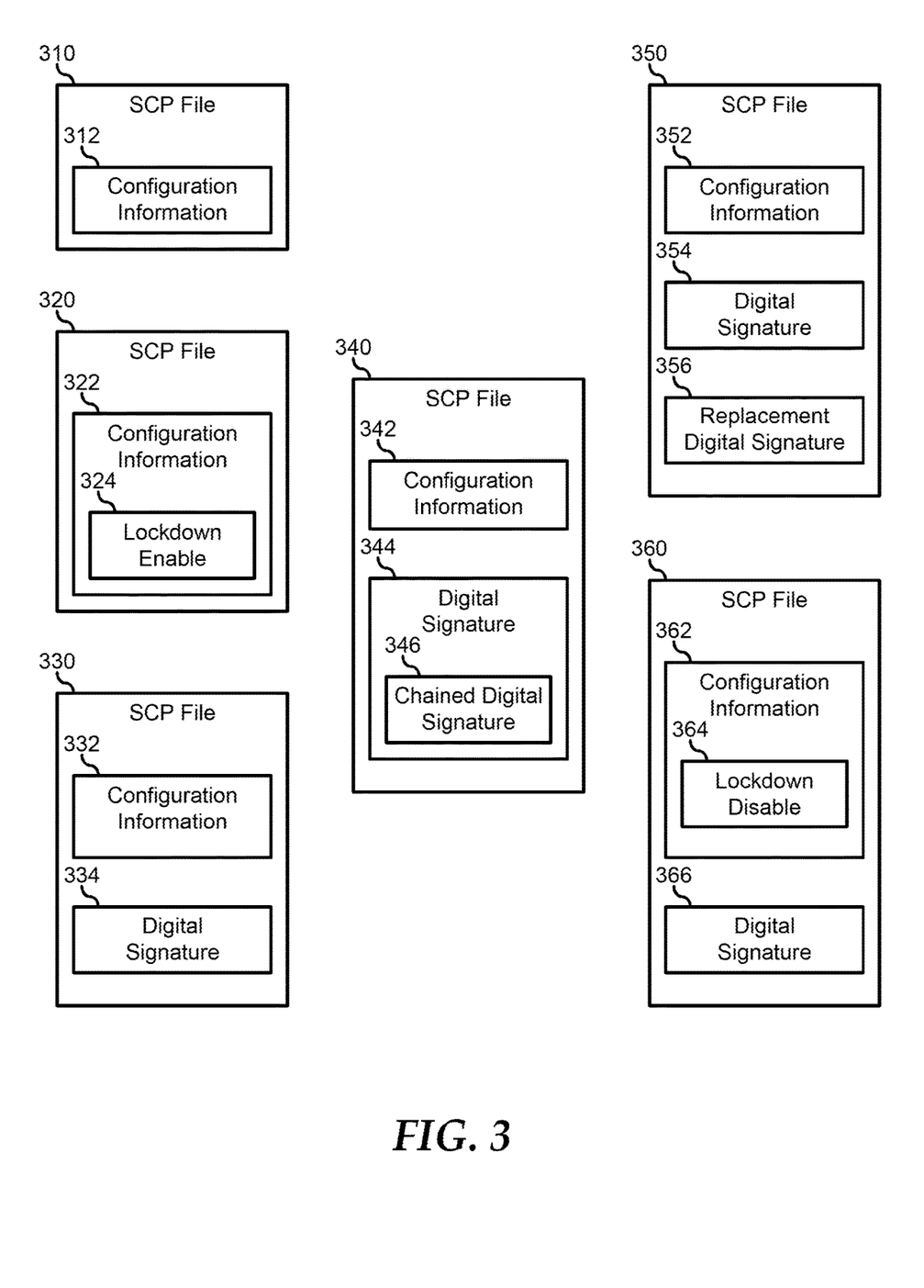
FIG. 3 illustrates various secure copy protocol (SCP) files according to various embodiments of the present disclosure.

FIG. 3 illustrates various embodiments of SCP files 310, 320, 330, 340, 350, and 360. SCP file 310 includes only configuration information 312. SCP file 320 includes configuration information 322 that further includes lockdown enable information 324. SCP file 330 includes configuration information 332 and a digital signature 334. SCP file 340 includes configuration information 342 and a digital signature 244. Digital signature 344 further includes a chained digital signature 346. SCP file 350 includes configuration information 352, a digital signature 354, and a replacement digital signature 356. SCP file 360 includes configuration information 362 and a digital signature 368. Configuration information 362 further includes lockdown enable information 364, and lockdown disable information 366. It will be understood that other variants of configuration files may be utilized as needed or desired.

Figure 4:
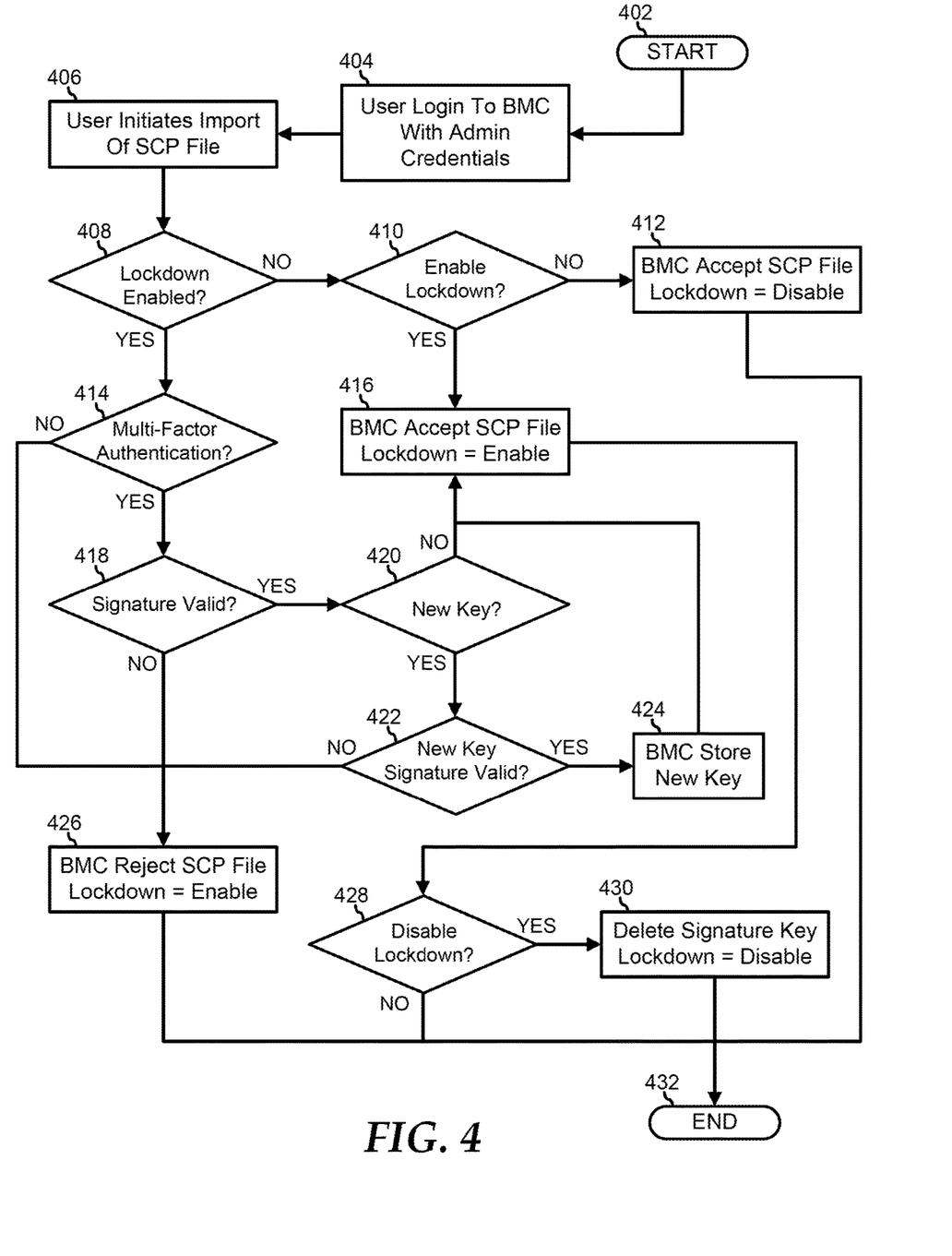
FIG. 4 is a flowchart illustrating a method for enabling and disabling a configuration lockdown mode in a baseboard management controller (BMC) according to an embodiment of the present disclosure.

SCP files 310, 320, 330, 340, 350, and 360 will be described in relation to FIG. 4 which illustrates a method for enabling and disabling a configuration lockdown mode in a BMC, starting at block 402. A user logs in to an information handling system with their administrator credentials in block 404. For example, an administrator may log on to a management system using a username/password pair to gain access to administrative functions of the management system. The user initiates the import of an SCP file to a processing system in block 406. For example, the user can format one or more management command, operation, procedure, macro, or other information that is interpretable by a BMC to implement and manage the various maintenance, operation, and system update processes into a SCP file. A decision is made as to whether or not the BMC is in the lockdown mode in decision block 408. If so, the "YES" branch of decision block 408 is taken and the method proceeds to decision block 414, as described below. If the BMC is not in the lockdown mode, the "NO" branch of decision block 408 is taken and a decision is made as to whether or not the SCP file includes a lockdown enable command or procedure in the configuration information in decision block 410. If not, the "NO" branch of decision block 410 is taken, the SCP file is accepted by the BMC and the BMC is held with the lockdown mode disabled in block 412, and the method ends in block 432. If the SCP file includes a lockdown enable command or procedure in the configuration information, the "YES" branch of decision block 410 is taken, the SCP file is accepted by the BMC and the lockdown mode enabled in block 416 and the method proceeds to block 428, as described below.

Note that if the BMC is not in the lockdown mode, as determined in decision block 408, then all of SCP files 310, 320, 330, 340, 350, and 360 will be processed in accordance with the "NO" branch of decision block 408. That is, all of configuration information 312, 322, 332, 342, 352, and 362 will be implemented by the BMC. Further, if as determined in decision block 410, then only SCP file 310 will be processed in accordance with the "NO" branch of decision block 410, but if the SCP file includes a lockdown enable command or procedure in the configuration information as determined in decision block 410, then SCP files 320, 330, 340, 350, and 360 will be processed in accordance with the "YES" branch of decision block 410.

Returning to decision block 408, if the BMC is in the lockdown mode, the "YES" branch of decision block 408 is taken and a decision is made as to whether or not the SCP file includes a multi-factor authentication, such as a digital signature, in decision block 414. If not, the "NO" branch of decision block 414 is taken, the SCP file is rejected by the BMC and the BMC remains in the lockdown mode in block 426, and the method ends in block 432. For example, SCP files 310 and 320 will be rejected when the lockdown mode is enabled, as determined in decision block 408, because neither of SCP files 310 or 320 include digital signatures. If the SCP file includes a multi-factor authentication, the "YES" branch of decision block 414 is taken, and a decision is made as to whether or not the digital signature is valid in decision block 418. If not, the "NO" branch of decision block 418 is taken, the SCP file is rejected by the BMC and the BMC remains in the lockdown mode in block 426, and the method ends in block 432. For example, if the BMC fails to validate any one of digital signatures 334, 344, 354, or 366, then the respective SCP file 330, 340, 350, or 360 with the invalid digital signature is rejected by the BMC.

If the digital signature is valid, the "YES" branch of decision block 418 is taken and the method proceeds to decision block 420, as described below. Here, any of SCP files 330, 340, 350, and 360 which have had their respective digital signatures 334, 344, 354, and 366 validated by the BMC will be processed in accordance with the "YES" branch of decision block 418. Note that the decision as made in decision block 418 may take account of a situation where a particular digital signature fails to be validated by the BMC, but where the associated SCP file includes one or more chained digital signatures that succeed in being validated by the BMC. Here, because a chain of trust is established with the chained digital signatures, the SCP file will be proceeds in accordance with the "YES" branch of decision block 418. For example, considering SCP file 340, if digital signature 344 fails to be validated, but chained digital signature 346 is successfully validated, then the SCP file will be processed in accordance with the "YES" branch of decision block 418.

In decision block 420, a decision is made as to whether or not the SCP file includes a replacement key. If not, the "NO" branch of decision block 420 is taken, the SCP file is accepted by the BMC and the lockdown mode enabled in block 416 and the method proceeds to block 428, as described below. If the SCP file includes a replacement key, the "YES" branch of decision block 420 is taken and the method proceeds to decision block 422, as described below. Note that SCP files 330, 340, and 360 will be processed in accordance with the "NO" branch of decision block 420, while only SCP file 350 will be processed in accordance with the "YES" branch of decision block 420. When the SCP file includes a replacement key and the "YES" branch of decision block 420 is taken, for example with SCP file 350, a decision is made as to whether or not the replacement key is determined to be valid by the BMC in decision block 422. If not, the "NO" branch of decision block 422 is taken, the SCP file is rejected by the BMC and the BMC remains in the lockdown mode in block 426, and the method ends in block 432. If the replacement key is determined to be valid by the BMC, the "YES" branch of decision block 422 is taken, the BMC stores the replacement key, such as replacement digital signature 356, replacing the old public key, in block 424, the SCP file is accepted by the BMC and the lockdown mode enabled in block 416 and the method proceeds to block 428, as described below.

When a SCP file is accepted by the BMC and the lockdown mode enabled in block 416, a decision is made as to whether or not the SCP file includes a lockdown disable command or procedure in the configuration information in decision block 428. If not, the "NO" branch of decision block 428 is taken and the method ends in block 432. If the SCP file includes a lockdown disable command or procedure in the configuration information, the "YES" branch of decision block 428 is taken, any existing public keys are deleted form the BMC and the lockdown mode is disabled in block 430, and the method ends in block 432. Here, only SCP file 460 is processed in accordance with the "NO" branch of decision block 428.

Figure 5:
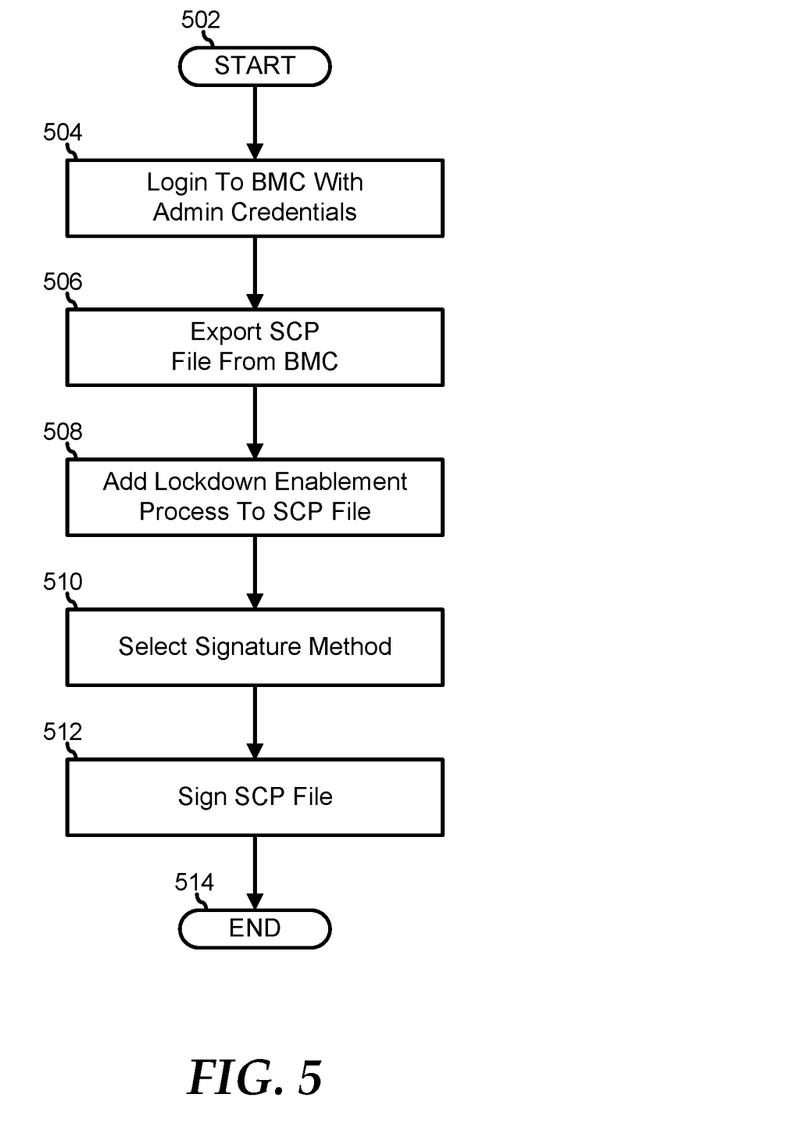
FIG. 5 is a flowchart illustrating a method for signing an SCP file according to an embodiment of the present disclosure.

FIG. 5 illustrates a method of signing a SCP file, starting at block 502. A user logs in to an information handling system with their administrator credentials in block 504. For example, an administrator may log on to a management system using a username/password pair to gain access to administrative functions of the management system. The user initiates an export of an SCP configuration file from the BMC in block 506. The user adds one or more management command, operation, procedure, macro, or other information that is interpretable by a BMC to implement and manage the lockdown feature of the BMC into a new SCP file in block 508. A signature method is selected in block 510. For example, the user can select between a self-signed digital signature, a digital signature provided by a HSM, a digital signature provided by a CA, or another digital signature, as needed or desired. The user adds the digital signature to the new SCP file in block 512, and the method ends in block 514.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a processor; and
   a baseboard management controller (BMC) configured to:
   receive a secure copy protocol (SCP) file including configuration information for the processor;
   determine whether the information handling system is in a lockdown mode in response to receiving the SCP file;

apply the configuration information to change a configuration of the processor in response to determining that the information handling system is not in the lockdown mode;
determine whether the SCP file includes a first digital signature in response to determining that the information handling system is in the lockdown mode; and
reject the configuration information in response to determining that the SCP file does not include the first digital signature.

2. The information handling system of claim 1, the BMC further configured to:
validate the first digital signature to determine whether the first digital signature is authentic in response to determining that the SCP file includes the first digital signature; and
reject the configuration information in response to not validating that the first digital signature is authentic.

3. The information handling system of claim 2, the BMC further configured to:
determine whether the SCP file includes a second digital signature in response to validating that the first digital signature is authentic.

4. The information handling system of claim 3, the BMC further configured to:
apply the configuration information to change the configuration of the information handling system in response to determining that the SCP file does not include the second digital signature.

5. The information handling system of claim 3, the BMC further configured to:
validate the second digital signature to determine whether the second digital signature is authentic in response to determining that the SCP file includes the second digital signature; and
reject the configuration information in response to not validating that the second digital signature is authentic.

6. The information handling system of claim 5, the BMC further configured to:
store a public key associated with the second digital signature in response to validating that the second digital signature is authentic; and
apply the configuration information to change the configuration of the information handling system.

7. The information handling system of claim 1, the BMC further configured to:
determine whether the configuration information includes lockdown information to disable the lockdown mode;
disable the lockdown mode in response to determining that the configuration information includes the lockdown information; and
delete a public key in response to determining that the configuration information includes the lockdown information.

8. The information handling system of claim 2, the BMC further configured to:
determine that the first digital signature is associated with a first configuration setting of the information handling system in response to validating that the first digital signature is authentic;
determine that the configuration information is associated with the first configuration setting; and
apply the configuration information to change the first configuration setting in response to determining that the first digital signature and the configuration information are associated with the first configuration setting.

9. The information handling system of claim 8, the BMC further configured to:
determine that the configuration information is not associated with the first configuration setting; and
reject the configuration information in response to determining that the first digital signature is associated with the first configuration setting and that the configuration information is not associated with the first configuration setting.

10. The information handling system of claim 2, wherein the configuration information includes a factory default reset setting to restore the configuration to factory default settings.

11. A method comprising:
receiving, by a baseboard management controller (BMC) of an information handling system, a secure copy protocol (SCP) file including configuration information for the information handling system;
determining, by the BMC, whether the information handling system is in a lockdown mode in response to receiving the SCP file;
applying the configuration information to change a configuration of the information handling system in response to determining that the information handling system is not in the lockdown mode;
determining, by the BMC, whether the SCP file includes a first digital signature in response to determining that the information handling system is in the lockdown mode; and
rejecting the configuration information in response to determining that the SCP file does not include the first digital signature.

12. The method of claim 11, further comprising:
validating, by the BMC, the first digital signature to determine whether the first digital signature is authentic in response to determining that the SCP file includes the first digital signature; and
rejecting the configuration information in response to not validating that the first digital signature is authentic.

13. The method of claim 12, further comprising:
determining, by the BMC, whether the SCP file includes a second digital signature in response to validating that the first digital signature is authentic.

14. The method of claim 13, further comprising:
applying, by the BMC, the configuration information to change the configuration of the information handling system in response to determining that the SCP file does not include the second digital signature.

15. The method of claim 13, further comprising:
validating, by the BMC, the second digital signature to determine whether the second digital signature is authentic in response to determining that the SCP file includes the second digital signature; and
rejecting the configuration information in response to not validating that the second digital signature is authentic.

16. The method of claim 15, further comprising:
storing, by the BMC, a public key associated with the second digital signature in response to validating that the second digital signature is authentic; and
applying the configuration information to change the configuration of the information handling system.

17. The method of claim 11, further comprising:
determining, by the BMC, whether the configuration information includes lockdown information to disable the lockdown mode;
disabling, by the BMC, the lockdown mode in response to determining that the configuration information includes the lockdown information; and
deleting, by the BMC, a public key in response to determining that the configuration information includes the lockdown information.

18. The method of claim 12, further comprising:
determining, by the BMC, that the first digital signature is associated with a first configuration setting of the information handling system in response to validating that the first digital signature is authentic;
determining, by the BMC, that the configuration information is associated with the first configuration setting;
applying the configuration information to change the first configuration setting in response to determining that the first digital signature and the configuration information are associated with the first configuration setting;
determining, by the BMC, that the configuration information is not associated with the first configuration setting; and
rejecting the configuration information in response to determining that the first digital signature is associated with the first configuration setting and that the configuration information is not associated with the first configuration setting.

19. The method of claim 12, wherein the configuration information includes a factory default reset setting to restore the configuration to factory default settings.

20. An information handling system, comprising:
a management system; and
a baseboard management controller (BMC) configured to:
  receive a secure copy protocol (SCP) file from the management system;
  determine whether the BMC is in a lockdown mode in response to receiving the SCP file;
  apply the configuration information to change a configuration of the processor in response to determining that the information handling system is not in the lockdown mode;
  determine whether the SCP file includes a first digital signature in response to determining that the information handling system is in the lockdown mode; and
  reject the configuration information in response to determining that the SCP file does not include the first digital signature.

* * * * *